United States Patent
Wang et al.

(10) Patent No.: US 10,470,084 B2
(45) Date of Patent: Nov. 5, 2019

(54) SERVICE PROCESSING METHOD, PCRF, AND SERVICE PROCESSING SYSTEM

(71) Applicant: Huawei Technologies Co., Ltd., Shenzhen, Guangdong (CN)

(72) Inventors: Xiaoyan Wang, Shenzhen (CN); Shufeng Shi, Xi'an (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 124 days.

(21) Appl. No.: 15/705,169

(22) Filed: Sep. 14, 2017

(65) Prior Publication Data

US 2018/0007586 A1 Jan. 4, 2018

Related U.S. Application Data

(63) Continuation of application No. PCT/CN2015/098992, filed on Dec. 25, 2015.

(30) Foreign Application Priority Data

Mar. 23, 2015 (CN) .......................... 2015 1 0127887

(51) Int. Cl.
*H04W 28/24* (2009.01)
*H04L 29/06* (2006.01)
(Continued)

(52) U.S. Cl.
CPC .......... *H04W 28/24* (2013.01); *H04L 12/1403* (2013.01); *H04L 12/1407* (2013.01);
(Continued)

(58) Field of Classification Search
CPC ............. H04L 12/1403; H04L 12/1407; H04L 65/1033; H04L 65/80; H04L 67/306;
(Continued)

(56) References Cited

U.S. PATENT DOCUMENTS

2009/0304015 A1* 12/2009 Willars ................. H04L 47/803
370/412
2010/0043053 A1* 2/2010 Wei ......................... H04L 47/10
726/1
(Continued)

FOREIGN PATENT DOCUMENTS

| CN | 101720112 A | 6/2010 |
| CN | 101730150 A | 6/2010 |

(Continued)

OTHER PUBLICATIONS

Aki Fukuoka et al., "A proposal for the Service Chaining Method using the Policy and Charging Control Architecture", Communication Society, The Institute of Electronics, Information and Communication Engineers, Sep. 23-26, 2014, 4 pages.
(Continued)

*Primary Examiner* — Robert J Lopata
(74) *Attorney, Agent, or Firm* — Womble Bond Dickinson (US) LLP

(57) ABSTRACT

Embodiments of the present disclosure disclose a service processing method, a PCRF, and a system. The method performed by the PCRF includes: obtaining service information of a service, where the service information includes a service identity; obtaining, according to user information and the service information, information indicating that the service requires QoS guarantee, and service chain information; when determining, according to the service chain information, that a network resource occupied by the service may be changed, sending the service identity and the information indicating that the service requires the QoS guarantee to a value-added service processor; receiving target service information, returned by the value-added service processor, of the service corresponding to the service identity; generating a first control policy according to the target service information; and sending the first control policy to a
(Continued)

PCEF, so that the PCEF reserves a first network resource according to the first control policy.

15 Claims, 7 Drawing Sheets

(51) Int. Cl.
| | |
|---|---|
| *H04L 29/08* | (2006.01) |
| *H04L 12/14* | (2006.01) |
| *H04M 15/00* | (2006.01) |
| *H04W 4/24* | (2018.01) |
| *H04W 28/26* | (2009.01) |

(52) U.S. Cl.
CPC .......... *H04L 65/1033* (2013.01); *H04L 65/80* (2013.01); *H04L 67/322* (2013.01); *H04M 15/00* (2013.01); *H04M 15/61* (2013.01); *H04M 15/62* (2013.01); *H04M 15/66* (2013.01); *H04M 15/68* (2013.01); *H04M 15/80* (2013.01); *H04M 15/8016* (2013.01); *H04M 15/81* (2013.01); *H04W 4/24* (2013.01); *H04L 67/306* (2013.01); *H04W 28/26* (2013.01)

(58) Field of Classification Search
CPC ..... H04L 67/322; H04M 15/00; H04M 15/61; H04M 15/62; H04M 15/66; H04M 15/68; H04M 15/80; H04M 15/8016; H04M 15/81; H04W 28/24; H04W 28/26; H04W 4/24
USPC ......................................................... 370/230
See application file for complete search history.

(56) References Cited

U.S. PATENT DOCUMENTS

| | | | | |
|---|---|---|---|---|
| 2015/0341285 | A1* | 11/2015 | Aysola | H04L 63/0428 370/392 |
| 2015/0358850 | A1* | 12/2015 | La Roche, Jr. | H04W 28/0215 370/328 |
| 2016/0072963 | A1* | 3/2016 | Cai | H04L 12/1407 370/259 |
| 2016/0127318 | A1* | 5/2016 | Hua | H04L 63/0263 726/1 |
| 2016/0337189 | A1* | 11/2016 | Liebhart | H04L 45/306 |
| 2016/0381175 | A1* | 12/2016 | Wu | H04L 12/6418 709/240 |
| 2017/0019341 | A1* | 1/2017 | Huang | H04L 41/0893 |
| 2017/0048148 | A1* | 2/2017 | Huang | H04L 67/1002 |
| 2017/0201466 | A1* | 7/2017 | Lu | H04L 29/08 |
| 2017/0201629 | A1* | 7/2017 | Li | H04L 12/1407 |
| 2017/0214535 | A1* | 7/2017 | Li | H04L 12/1407 |
| 2017/0222953 | A1* | 8/2017 | Liu | H04L 29/08 |
| 2017/0250902 | A1* | 8/2017 | Rasanen | H04L 45/306 |
| 2017/0250903 | A1* | 8/2017 | Rasanen | H04L 41/50 |
| 2017/0310493 | A1* | 10/2017 | Wang | H04L 29/06 |

FOREIGN PATENT DOCUMENTS

| | | |
|---|---|---|
| CN | 101730246 A | 6/2010 |
| CN | 102045680 A | 5/2011 |
| CN | 103458388 A | 12/2013 |
| CN | 103581864 A | 2/2014 |
| EP | 2398262 A1 | 12/2011 |
| JP | H11313048 A | 11/1999 |
| JP | 2001145103 A | 5/2001 |

OTHER PUBLICATIONS

Chiharu Morioka et al., "A Study on Policy Control Functions in Service Chaining Architecture", IEICE Technical Report vol. 114, No. 477, Feb. 23, 2015, 7 pages.

Huawei, HiSilicon, "One Alternative Solution for FMSS", SA WG2 Meeting #107, Jan. 26-30, 2015, Sorrento, Italy, 4 pages, S2-150285.

H. Li et al., "Service Function Chain control framework draft-ww-sfc-control-plane-01", Service Function Chaining, Internet-Draft, Jul. 2, 2014, 11 pages.

Ericsson, AT&T, "Solution for FMSS: New interface for traffic steering", SA WG2 Meeting #107, Jan. 26-30, 2015, Sorrento, Italy, 7 pages, S2-150087.

\* cited by examiner

SERVICE PROCESSING METHOD, PCRF, AND SERVICE PROCESSING SYSTEM

CROSS-REFERENCE TO RELATED APPLICATIONS

This application is a continuation of International Application No. PCT/CN2015/098992, filed on Dec. 25, 2015, which claims priority to Chinese Patent Application No. 201510127887.5, filed on Mar. 23, 2015. The disclosures of the aforementioned applications are hereby incorporated by reference in their entireties.

TECHNICAL FIELD

The present application relates to the communications field, and in particular, to a service processing method, a PCRF, and a system processing system.

BACKGROUND

When a network service provider provides a service for a user in a communications network, quality of service needs to be taken into consideration to meet the user's requirement for service quality. With regard to this requirement, the 3rd Generation Partnership Project (3GPP) standards define a Policy and Charging Control (PCC) architecture. In the architecture, services can be detected, and quality of service (QoS) control and charging control can be performed on different services. In addition, the network service provider provides a value-added service, such as a firewall, network address translation (NAT), or video optimization, for the user on a Gi local area network (Gi-LAN).

A current network resource reservation procedure in the PCC mechanism defined in 3GPP is basically as follows: When user equipment (UE) accesses a service provided by an application function (AF), the AF sends an Rx session request to a policy and charging rules function (PCRF), where the request carries service information; the PCRF stores the service information, generates a control policy according to the service information, and delivers the control policy to a policy and charging enforcement function (PCEF); and the PCEF executes the network resource reservation procedure.

However, after a value-added service processor processes some value-added business services (such as a video optimization service) provided by the network service provider, network resources occupied by the processed services change. In the existing network resource reservation procedure, the PCRF still formulates a control policy according to the service information delivered by the AF by using an Rx interface, and sends the control policy to the PCEF, and the PCEF reserves a network resource according to the control policy. In this case, a network resource obtained by the user is a network resource occupied by the service before value-added processing, but not a network resource required by the service after the value-added processing. The reserved network resource is unrelated to an actual user requirement, which affects service experience of the user.

SUMMARY

Embodiments of the present disclosure provide a service processing method, a PCRF, and a service processing system, to improve service experience of a user according to the user's actual requirement.

A first aspect of the embodiments of the present disclosure provides a service processing method, including:

obtaining, by a PCRF, service information of a service, where the service information includes a service identity;

obtaining, by the PCRF according to user information and the service information, information indicating that the service requires quality of service QoS guarantee, and service chain information;

when the PCRF determines, according to the service chain information, that a network resource occupied by the service may be changed, sending, by the PCRF, the service identity and the information indicating that the service requires the QoS guarantee to a value-added service processor;

receiving, by the PCRF, target service information, returned by the value-added service processor, of the service corresponding to the service identity; and generating, by the PCRF, a first control policy according to the target service information, and sending the first control policy to a PCEF, so that the PCEF reserves a first network resource according to the first control policy.

With reference to the first aspect, in a first possible implementation of the first aspect, the service chain information includes a value-added service type list, and that the PCRF determines, according to the service chain information, that a network resource occupied by the service may be changed specifically includes:

determining, by the PCRF, whether the value-added service type list includes a preset service type; and if the value-added service type list includes the preset service type, determines that the network resource occupied by the service may be changed.

With reference to the first aspect, in a second possible implementation of the first aspect, the service chain information includes a service chain identity, and that the PCRF determines, according to the service chain information, that a network resource occupied by the service may be changed specifically includes:

determining, by the PCRF, whether the service chain identity is a preset identity; and if the service chain identity is the preset identity, determines that the network resource occupied by the service may be changed.

With reference to the first aspect, or the first possible implementation of the first aspect, or the second possible implementation of the first aspect, in a third possible implementation of the first aspect, the obtaining, by the PCRF, according to user information and the service information, information indicating that the service requires QoS guarantee specifically includes:

when the PCRF determines, according to the user information and the service information, that the service requires the QoS guarantee, generating, by the PCRF, a QoS guarantee indication, where the information indicating that the service requires the QoS guarantee is the QoS guarantee indication.

With reference to the first aspect, or the first possible implementation of the first aspect, or the second possible implementation of the first aspect, or the third possible implementation of the first aspect, in a fourth possible implementation of the first aspect, the service processing method further includes:

generating, by the PCRF, a control parameter according to the user information and the service information; and the sending, by the PCRF, the service identity and the information indicating that the service requires the QoS guarantee to a value-added service processor includes:

sending, by the PCRF, the service identity, the information indicating that the service requires the QoS guarantee, and the control parameter to the value-added service processor, so that the value-added service processor processes, according to the control parameter, the service corresponding to the service identity, to obtain the target service information.

With reference to the first aspect, or the first possible implementation of the first aspect, or the second possible implementation of the first aspect, or the third possible implementation of the first aspect, or the fourth possible implementation of the first aspect, in a fifth possible implementation of the first aspect, the service processing method further includes:

receiving, by the PCRF, a fault notification that a fault occurs in the value-added service processor;

determining, by the PCRF, the first control policy according to the fault notification and the service information;

modifying, by the PCRF, the first control policy according to the service information, to obtain a second control policy; and sending, by the PCRF, the second control policy to the PCEF, so that the PCEF changes the first network resource into a second network resource according to the second control policy.

With reference to the fifth possible implementation of the first aspect, in a sixth possible implementation of the first aspect, the determining, by the PCRF, the first control policy according to the fault notification and the service information includes:

determining, by the PCRF according to a value-added service type that is corresponding to the value-added service processor and is carried in the fault notification, service chain information corresponding to the value-added service type;

determining, by the PCRF according to the service chain information, a target service identity corresponding to the service chain information; and when the target service identity is the same as the service identity included in the service information, determining, by the PCRF, that a policy corresponding to the target service identity is the first control policy.

A second aspect of the embodiments of the present disclosure provides a service processing method, including:

obtaining, by a PCRF, service information of a service, where the service information includes a service identity;

when the PCRF determines, according to user information and the service information, that the service requires quality of service QoS guarantee, generating, by the PCRF, service chain information;

sending, by the PCRF, the service chain information and the service identity to a service chain system;

receiving, by the PCRF, target service information, returned by the service chain system, of the service corresponding to the service identity;

generating, by the PCRF, a first control policy according to the target service information; and sending, by the PCRF, the first control policy to a PCEF, so that the PCEF reserves a first network resource according to the first control policy.

With reference to the second aspect, in a first possible implementation of the second aspect, the receiving, by the PCRF, target service information, returned by the service chain system, of the service corresponding to the service identity includes:

receiving, by the PCRF, target service information returned by a value-added service processor for QoS guarantee in the service chain system, where the target service information is obtained after the value-added service processor for QoS guarantee processes the service corresponding to the service identity.

A third aspect of the embodiments of the present disclosure provides a PCRF, including:

an obtaining module, configured to obtain service information of a service, where the service information includes a service identity;

a service chain decision module, configured to obtain, according to user information and the service information, information indicating that the service requires quality of service QoS guarantee, and service chain information;

a first sending module, configured to: when it is determined, according to the service chain information, that a network resource occupied by the service may be changed, send the service identity and the information indicating that the service requires the QoS guarantee to a value-added service processor;

a receiving module, configured to receive target service information, returned by the value-added service processor, of the service corresponding to the service identity;

a control decision module, configured to generate a first control policy according to the target service information; and a second sending module, configured to send the first control policy to a PCEF, so that the PCEF reserves a first network resource according to the first control policy.

With reference to the third aspect, in a first possible implementation of the third aspect, the service chain decision module is further configured to generate a control parameter according to the user information and the service information; and the first sending module is specifically configured to: when it is determined, according to the service chain information, that the network resource occupied by the service may be changed, send the service identity, the information indicating that the service requires the QoS guarantee, and the control parameter to the value-added service processor, so that the value-added service processor processes, according to the control parameter, the service corresponding to the service identity, to obtain the target service information.

With reference to the third aspect, or a first possible implementation of the third aspect, in a second possible implementation of the third aspect, the receiving module is further configured to receive a fault notification that a fault occurs in the value-added service processor; and the PCRF further includes a determining module and a modification module, where the determining module is configured to determine the first control policy according to the fault notification and the service information;

the modification module is configured to modify the first control policy according to the service information, to obtain a second control policy; and the second sending module is further configured to send the second control policy to the PCEF, so that the PCEF changes the first network resource into a second network resource according to the second control policy.

It may be learned from the foregoing technical solutions that the embodiments of the present disclosure have the following advantages:

In the embodiments of the present disclosure, a PCRF obtains service information, and makes a service chain decision according to user information and the service information, to obtain information indicating that a service requires QoS guarantee, and service chain information; when determining, according to the service chain information, that a network resource occupied by the service may be changed, the PCRF sends a service identity and the information indicating that the service requires the QoS guarantee to a value-added service processor; the PCRF receives target service information, returned by the value-added service processor, of the service corresponding to the service identity; and the PCRF generates a first control policy according to the target service information and sends the first control policy to a PCEF, so that the PCEF reserves a network resource according to the first control policy. In this case, a network resource used by a user is a network resource corresponding to a guaranteed service after value-added processing, thereby meeting the user's actual requirement and improving service experience of the user.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons skilled in the art based on the embodiments of the present disclosure without creative efforts shall fall within the protection scope of the present disclosure.

Figure 1:
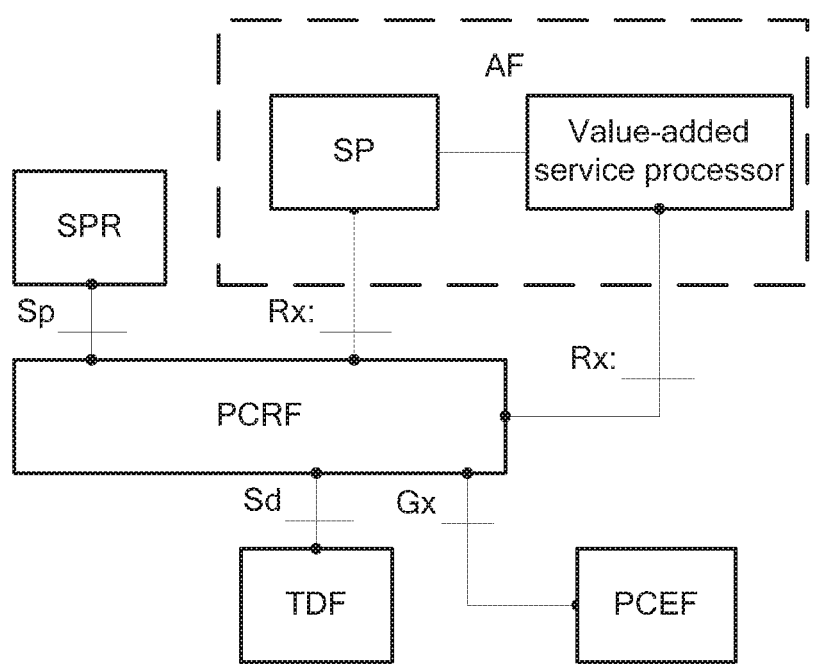
FIG. 1 is a schematic diagram of a PCC architecture according to an embodiment of the present disclosure.

FIG. 1 is a schematic diagram of a PCC architecture according to an embodiment of the present disclosure. The PCC architecture includes:

PCRF: This functional entity determines a corresponding policy according to a restriction of accessing a network by a user, a network service provider policy, user subscription data obtained from an SPR, or information, obtained from an AF, about a service being performed by a user, and provides the policy to a PCEF. The PCEF executes the policy. The policy may include a service data flow detection rule, whether to perform gating on a data flow, QoS corresponding to a service data flow, a charging rule based on a data flow, or the like.

PCEF: This functional entity mainly includes a function such as service data flow detection, policy execution, or flow-based charging, to ensure QoS of a service data flow, session management, or the like.

AF: This functional entity dynamically provides application-layer session information to the PCRF. The PCRF dynamically generates or modifies a rule according to the session information.

Optionally, the PCC architecture in this embodiment of the present disclosure further provides a subscription profile repository (SPR). This functional entity provides information about all subscribers or subscription-related information to the PCRF. The subscription information provided by the SPR includes: a subscriber's allowed service, a priority of each allowed service, a subscriber's allowed QoS information, charging-related information, such as an access type, location information, and a use quantity, of a subscriber service, or a type of a subscriber.

Optionally, the PCC architecture in this embodiment of the present disclosure further provides a traffic detection function (TDF). This functional entity detects an application and reports the detected application and service traffic of the detected application to the PCRF, and the PCRF makes a decision. The TDF further executes functions such as gating, redirection, and bandwidth restriction.

Because other functional entities are unrelated to the present disclosure, details are not described herein.

The following describes interfaces in the PCC architecture:

Rx interface: This interface is used to exchange application-level session information between the AF and the PCRF, for example, to identify a service data flow and perform policy control and charging on different service data flows, or used for a QoS media/application bandwidth requirement.

Gx interface: This interface is used by the PCRF to dynamically control a PCC rule executed by the PCEF, or used for PCC rule exception handling.

Optionally, the PCC architecture in this embodiment of the present disclosure further provides an Sp interface, and this interface is used by the PCRF to request user subscription data from the SPR.

Optionally, the PCC architecture in this embodiment of the present disclosure further provides an Sd interface, and this interface is used by the TDF to report application start/stop information, a data flow description, and an application identifier to the PCRF, report accumulated network resource usage of each TDF session, and request an application data center (ADC) decision from the PCRF, and the like.

Because other interfaces are unrelated to the present disclosure, details are not described herein.

The PCRF is connected to the AF by using the Rx interface, connected to the PCEF by using the Gx interface, connected to the SPR by using the Sp interface, and connected to the TDF by using the Sd interface. The PCEF is connected to the PCRF by using the Gx interface.

In this embodiment of the present disclosure, the AF is a collective name for some network elements having execution functions, including a third-party service provider (SP), a value-added service processor, or the like.

The value-added service processor is an AF that performs value-added processing on a service, and can change service information of the service. The value-added service processor may be a video optimizer, an audio optimizer, a firewall, NAT, or the like; or may be another AF that is provided by a network service provider and used for a value-added service. This is not limited herein.

Figure 2:
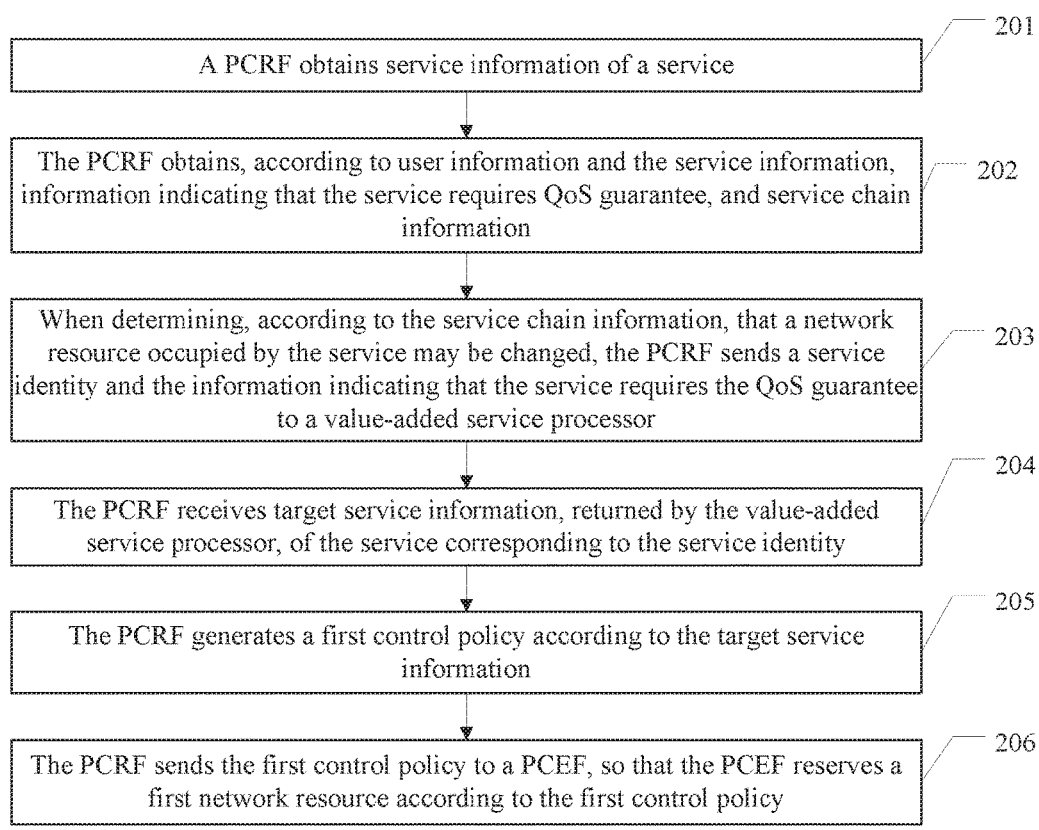
FIG. 2 is a schematic flowchart of a service processing method according to an embodiment of the present disclosure.

Referring to FIG. 2, an embodiment of the service processing method in an embodiment of the present disclosure includes the following steps.

201. A PCRF obtains service information of a service.

The PCRF may obtain the service information of the service. The service information may come from an AF, a PCEF, or a TDF.

The service information is a parameter that can indicate the service, and is used by the PCRF to make a decision on the service. The service information may include a service identity, a service type, a service format, a service priority, bandwidth, a bit rate, or the like; or may include other information of the service. This is not limited herein.

202. The PCRF obtains, according to user information and the service information, information indicating that the service requires QoS guarantee, and service chain information.

The PCRF may obtain user-related information from another functional entity in the PCC architecture. The user information may be user subscription information from an SPR, network congestion information, from a radio access network congestion awareness function (RCAF), of a network in which a user is located, user location information from the PCEF, or an access network type from the PCEF; or may be other information of the user who accesses the service. This is not limited herein.

When the user is a QoS guaranteed user, and the service accessed by the user belongs to a guaranteed service of a network service provider, the PCRF generates QoS guarantee information for the service and generates service chain information. The service chain information is information that can indicate a service chain in a service chain system, the service chain information is corresponding to a service chain, and the service chain includes at least one value-added service processor. The service chain information includes a value-added service type list and/or a service chain identity, the value-added service type list includes at least one value-added service type, and the value-added service processor may perform value-added processing on the service.

When the user is a non-guaranteed user, or the service accessed by the user does not belong to a guaranteed service of a network service provider, the PCRF executes a non-guaranteed service procedure. This procedure belongs to the prior art, and details are not described herein.

203. When the PCRF determines, according to the service chain information, that a network resource occupied by the service may be changed, the PCRF sends a service identity and the information indicating that the service requires the QoS guarantee to a value-added service processor.

When the PCRF determines, according to the service chain information, that the network resource occupied by the service may be changed, it indicates that the service chain includes a value-added service processor that may change the network resource. After the service is processed by the value-added service processor, the service information of the service may be changed, and the network resource occupied by the service needs to be adjusted for the service.

Because a process in which the PCRF sends the service identity and the information indicating that the service requires the QoS guarantee to the value-added service processor belongs to the prior art, details are not described herein.

After receiving the service identity, the value-added service processor may determine the service according to the service identity, perform value-added processing on the service to obtain a target service and obtain target service information, and return the target service information according to the information indicating that the service requires the QoS guarantee.

204. The PCRF receives target service information, returned by the value-added service processor, of the service corresponding to the service identity.

It should be noted that, the value-added service processor may change the network resource occupied by the service, the value-added service processor may directly send the target service information to the PCRF, or may send the target service information to the PCRF by using another network element. This is not limited herein.

205. The PCRF generates a first control policy according to the target service information.

Because the target service information includes information about a network resource occupied by the target service, after receiving the target service information, the PCRF may generate the first control policy according to the target service information, to reserve the network resource occupied by the target service.

It should be noted that, after the service is processed by the value-added service processor, a QoS parameter included in the obtained target service information is different from a QoS parameter included in the service information before the processing. The PCRF may generate the first control policy according to the QoS parameter in the target service information. The QoS parameter is used to control the network resource occupied by the processed service.

The first control policy is a PCC rule for controlling a network resource occupied by a service, may include a rule name, a service flow identity, a QoS parameter, and the like, and may further include other information of the service. This is not limited herein.

The QoS parameter is used to control a service, and may include the following parameter:

QoS class identifier (QCI): a network node may process a data packet according to the QCI, and different QCIs are corresponding to different packet loss rates, different delays, or different jitters;

allocation/retention priority (ARP): used to indicate whether a service flow can preempt a resource of another service flow, or a resource of a service flow can be preempted by another service flow when network resources are insufficient;

guaranteed bit rate (GBR): refers to minimum bandwidth available to a service when network resources are strained; or maximum bit rate (MBR): refers to maximum bandwidth of a service flow, that is, network bandwidth occupied by the service flow needs to be less than the bandwidth.

206. The PCRF sends the first control policy to a PCEF, so that the PCEF reserves a first network resource according to the first control policy.

After generating the first control policy, the PCRF sends the first control policy to the PCEF, and the PCEF may reserve the first network resource according to the first control policy. The first network resource is the network resource occupied by the target service.

A specific process in which the PCEF reserves, according to the first control policy, the network resource occupied by the target service belongs to the prior art, and details are not described herein.

In this embodiment of the present disclosure, a PCRF obtains service information, and makes a service chain decision according to user information and the service information, to obtain information indicating that a service requires QoS guarantee, and service chain information; when determining, according to the service chain information, that a network resource occupied by the service may be changed, the PCRF sends a service identity and the information indicating that the service requires the QoS guarantee to a value-added service processor; the PCRF receives target service information, returned by the value-added service processor, of the service corresponding to the service identity; and the PCRF generates a first control policy according to the target service information, and sends the first control policy to a PCEF, so that the PCEF reserves a network resource according to the first control policy. In this case, a network resource used by a user is a network resource corresponding to a guaranteed service after value-added processing, thereby meeting the user's actual requirement and improving service experience of the user.

Optionally, on the basis of the embodiment shown in FIG. 2, in another embodiment of the service processing method in this embodiment of the present disclosure, the service chain information includes the value-added service type list, and that the PCRF determines, according to the service chain information, that a network resource occupied by the service may be changed specifically includes:

determining, by the PCRF, whether the value-added service type list includes a preset service type; and if the value-added service type list includes the preset service type, determines that the network resource occupied by the service may be changed.

In this embodiment, a value-added service provided by the network service provider to the user may be content filtering, NAT, a firewall, audio optimization, video optimization, or the like. The network service provider may set a value-added service that may change the service information as a preset service type. The value-added service type list included in the service chain information may include one or more value-added service types, and this is not limited herein.

When the value-added service type list includes the preset service type, for example, "video optimization", it indicates that the service chain that processes the service includes a video optimizer; because the video optimizer may change a network resource occupied by a video stream, it may be determined that the network resource occupied by the service may be changed, and a corresponding network resource needs to be reserved for an optimized video stream. When the value-added service type included in the value-added service type list is not the preset service type, for example, when the value-added service type is "NAT", it indicates that the service chain that processes the service includes a network address translation processor; service processing of the network address translation processor does not change the network resource occupied by the service, and therefore it may be determined that the network resource occupied by the service may not be changed.

Optionally, on the basis of the embodiment shown in FIG. 2, in another embodiment of the service processing method in this embodiment of the present disclosure, the service chain information includes the service chain identity, and that the PCRF determines, according to the service chain information, that a network resource occupied by the service may be changed may be implemented in the following manner:

determining, by the PCRF, whether the service chain identity is a preset identity; and if the service chain identity is the preset identity, determines that the network resource occupied by the service may be changed.

In this embodiment, a service chain identity is in a one-to-one correspondence with a service chain, and the network service provider may set a service chain identity of a service chain used for value-added service processing as the preset identity. Assuming that the service chain identity is 1 and is corresponding to a service chain "firewall-audio optimization-NAT", the service chain may change the network resource occupied by the service, and the service chain identity belongs to the preset identity. Assuming that the service chain identity is 2 and is corresponding to a service chain "firewall-NAT", the service chain cannot change the network resource occupied by the service, and the service chain identity does not belong to the preset identity.

Optionally, on the basis of the embodiment shown in FIG. 2 or the optional embodiment, in another embodiment of the service processing method in this embodiment of the present disclosure, that the PCRF obtains, according to user information and the service information, information indicating that the service requires QoS guarantee may be implemented in the following manner:

when determining, according to the user information and the service information, that the service requires the QoS guarantee, the PCRF generates a QoS guarantee indication, where the information indicating that the service requires the QoS guarantee is the QoS guarantee indication.

In this embodiment, when the user is a QoS guaranteed user, and the service accessed by the user belongs to a guaranteed service of the network service provider, the PCRF may generate a QoS guarantee indication, to instruct to perform the QoS guarantee on the service. The QoS guarantee indication may be a PCC rule or a binary character, and this is not limited herein.

Optionally, on the basis of the embodiment shown in FIG. 2 or the optional embodiment, in another embodiment of the service processing method in this embodiment of the present disclosure, the service processing method further includes:

the PCRF generates a control parameter according to the user information and the service information; and that the PCRF sends the service identity and the information indicating that the service requires the QoS guarantee to a value-added service processor includes: the PCRF sends the service identity, the information indicating that the service requires the QoS guarantee, and the control parameter to the value-added service processor, so that the value-added service processor processes, according to the control parameter, the service corresponding to the service identity, to obtain the target service information.

In this embodiment, the PCRF may generate the control parameter according to the user information and the service information, and send the service identity, the information indicating that the service requires the QoS guarantee, and the control parameter to the value-added service processor. After receiving the service identity, the information indicating that the service requires the QoS guarantee, and the control parameter, the value-added service processor determines the service according to the service identity, processes the service according to the control parameter to obtain the target service information, and returns the target service information to the PCRF according to the information indicating that the service requires the QoS guarantee.

Optionally, on the basis of the embodiment shown in FIG. 2 or the optional embodiment, in another embodiment of the service processing method in this embodiment of the present disclosure, the service processing method further includes:

The PCRF receives a fault notification that a fault occurs in the value-added service processor.

In this embodiment, when a fault occurs in the value-added service processor in the service chain system, a service controller or a service commander in the service chain system may detect the fault and send a fault notification of the fault to the PCRF, and the PCRF may receive the fault notification.

The fault notification may include a type of the value-added service processor in which the fault occurs, a time at which the fault occurs, a fault type, or other information, and this is not limited herein.

It should be noted that, when a fault occurs in the value-added service processor, the value-added service processor cannot provide a value-added service for the user any more; therefore, the network service provider does not need to reserve the network resource occupied by the target service for the user, and the PCRF needs to modify the first control policy, so that the PCEF reserves a network resource occupied by a non-value-added service.

The PCRF determines the first control policy according to the fault notification and the service information.

When the value-added service processor in which the fault occurs is a value-added service processor that may change the service information, the PCRF determines the first control policy according to the fault notification and the service information.

When the value-added service processor in which the fault occurs is a value-added service processor that may not change the service information, the PCRF may generate an alarm notification, or may execute another procedure. This is not limited herein.

It should be noted that, after obtaining the service information, the PCRF may store the service information in the PCRF or another storage network element; and when the PCRF needs the service information, the PCRF may obtain the service information from the PCRF or the another storage network element.

The PCRF modifies the first control policy according to the service information, to obtain a second control policy.

A QoS parameter in the first control policy is used to control a network resource occupied by a service that has been processed by the value-added processor. A QoS parameter in the second control policy is used to control a network resource occupied by a service that has not been processed by the value-added processor.

The PCRF may generate the QoS parameter according to the service information, and modify the first control policy according to the QoS parameter, to obtain the second control policy. The second control policy is obtained after the PCRF makes a decision according to the user information and the service information of the service on which no value-added processing is performed, and is used to reserve the network resource occupied by the non-value-added service.

The PCRF sends the second control policy to the PCEF, so that the PCEF changes the first network resource into a second network resource according to the second control policy.

The second network resource is the network resource occupied by the non-value-added service. Because the value-added service processor cannot provide a value-added service for the user, the service accessed by the user is a non-value-added service in this case, and the network service provider changes the first network resource corresponding to the service into the second network resource, thereby meeting the user's actual requirement and improving user experience.

Optionally, on the basis of the embodiment shown in FIG. 2 or the optional embodiment, in another embodiment of the service processing method in this embodiment of the present disclosure, that the PCRF determines the first control policy according to the fault notification and the service information further includes:

The PCRF determines, according to a value-added service type that is corresponding to the value-added service processor and is carried in the fault notification, service chain information corresponding to the value-added service type.

The service chain information may be a value-added service type list and/or a service chain identity.

The PCRF determines, according to the service chain information, a target service identity corresponding to the service chain information.

In this embodiment, the target service is a service on which value-added processing is performed; the target service identity is corresponding to the target service, and is specifically an IP 5-tuple of the target service, or another identity that can be used to determine the target service. This is not limited herein.

When the target service identity is the same as the service identity included in the service information, the PCRF determines that a policy corresponding to the target service identity is the first control policy.

It may be understood that the PCRF may determine the first control policy by using another method according to the fault notification and the service information, and this is not limited herein.

For ease of understanding, the following describes the service processing method in this embodiment of the present disclosure in detail by using a specific application scenario:

In the specific application scenario of this embodiment, an AF is a video provider, a service is a video service provided by the video provider, service information is video stream information, and a network resource is bandwidth. In addition, it is assumed that Zhang San is a gold user of a network service provider, the network service provider provides a video guaranteed service and a video optimization service for the gold user, and the network service provider provides a guaranteed service for the video provider. For a network architecture that implements this embodiment, refer to FIG. 1, in which the SP is located on the video provider side, and the SPR, the PCRF, the PCEF, the TDF, the RCAF, and the value-added service processor are located on the network service provider side. A specific implementation procedure is as follows:

The PCRF may obtain the video stream information of a video from the video provider, where a video identity included in the video stream information is, for example, "nba020703".

When Zhang San accesses the video provided by the video provider, the PCRF may determine, according to "Zhang San is a gold user of the network service provider", "the network service provider provides a video guaranteed service and a video optimization service for the gold user", and "the network service provider provides a guaranteed service for the video provider", that the video requires QoS guarantee, and determine service chain information. The service chain information is, for example, "003, video optimization-NAT", where "003" is a service chain identity, "video optimization-NAT" is a value-added service type list, including two value-added service types: "video optimization" and "NAT".

Assuming that "003, video optimization-NAT" is service chain information that may change bandwidth, "003" is a preset identity, and the PCRF may determine, according to that "003" is the preset service identity, that bandwidth occupied by the video may be changed. Alternatively, because "video optimization" may change bandwidth, it may also be assumed that "video optimization" is a preset service type, and when the PCRF detects that "video optimization-NAT" in the service chain information "003, video optimization-NAT" includes "video optimization", it may also be determined that bandwidth occupied by the video may be changed.

Information indicating that the service requires the QoS guarantee may be a QoS guarantee indication, used to instruct to perform the QoS guarantee on the video, and may be, for example, "zs03". The PCRF sends "nba020703" and "zs03" to the video optimizer.

The video optimizer may obtain target service information by optimizing the video with the identity "nba020703", and the target service information is optimized video stream information. Specifically, part of the video stream information before and after video optimization is shown in the following table:

|  | Video identity | Codec type | Bitstream (kbps) | Frame frequency (fps) | Required bandwidth (kbps) |
| --- | --- | --- | --- | --- | --- |
| Before optimization | nba020703 | H.263 | 384 | 30 | 416 |
| After optimization | nba020703 | H.263 | 64 | 15 | 74 |

The video optimizer returns the optimized video stream information according to "zs03".

The PCRF receives the optimized video stream information returned by the video optimizer, for example, ('nba020703', 'H.263', '64 kbps', '15 fps', '74 kbps').

The PCRF determines a QoS parameter corresponding to the video according to ('nba020703', 'H.263', '64 kbps', '15 fps', '74 kbps'), so as to generate a first control policy. For example, the first control policy is ('GZ004', 'nba020703', '74 kbps', '8', '2', '30 kbps', '500 kbps'), where 'GZ004' is a PCC rule name, 'nba020703' is a video stream identity, '74 kbps' is bandwidth required by the optimized video stream, '8' is a QCI, '2' is an ARP, '30 kbps' is a GBR, and '500 kbps' is an MBR.

The PCRF sends ('GZ004', 'nba020703', '74 kbps', '8', '2', '30 kbps', '500 kbps') to the PCEF, and the PCEF sets bandwidth corresponding to the video stream of 'nba020703' to 74 kbps according to ('GZ004', 'nba020703', '74 kbps', '8', '2', '30 kbps', '500 kbps'). In this case, the bandwidth provided by the network service provider for Zhang San is the bandwidth required by the optimized video stream, thereby meeting the user's actual requirement.

It should be understood that, the foregoing example is merely illustrative, and in specific actual application, the video stream information, the video identity, the service chain information, and the first control policy may also be indicated in another form. This is not limited herein.

Figure 3:
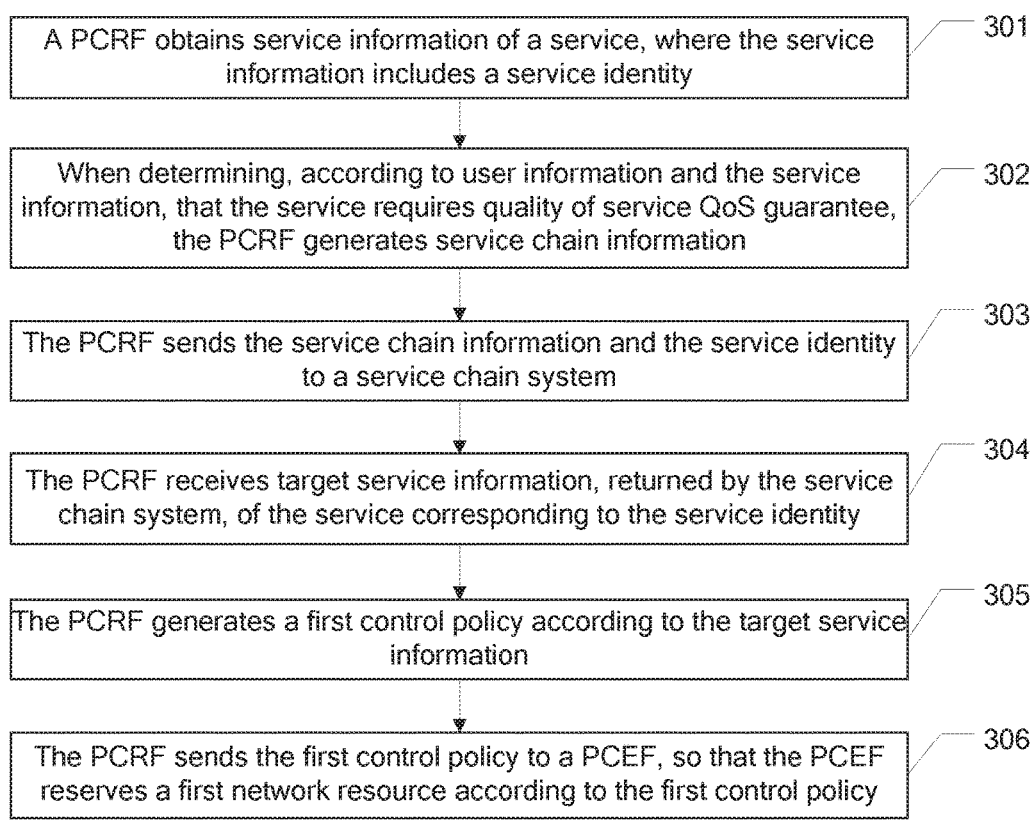
FIG. 3 is another schematic flowchart of a service processing method according to an embodiment of the present disclosure.

In actual application, the network service provider may also set a value-added service processor dedicated to QoS service processing, and correspondingly, service information processing of the PCRF set by the network service provider may also be different. Referring to FIG. 3, another embodiment of the service processing method in this embodiment of the present disclosure includes the following steps.

301. A PCRF obtains service information of a service, where the service information includes a service identity.

Step 301 is similar to step 201 in the embodiment shown in FIG. 2, and this is not limited herein.

302. When the PCRF determines, according to user information and the service information, that the service requires quality of service QoS guarantee, the PCRF generates service chain information.

The PCRF may obtain user-related information from another functional entity in a PCC architecture. The user information may be user subscription information from an SPR, network congestion information, from an RCAF, of a network in which a user is located, user location information from a PCEF, or an access network type from a PCEF; or may be other information of a user who accesses the service. This is not limited herein.

When determining, according to the user information and the service information, that the service requires the quality of service QoS guarantee, the PCRF generates the service chain information. The service chain information is corresponding to a service chain, and the value-added service processor included in the service chain is dedicated to processing of a service that requires the QoS guarantee, and not process a non-QoS guaranteed service.

303. The PCRF sends the service chain information and the service identity to a service chain system.

After generating the service chain information, the PCRF sends the service chain information and the service identity to the service chain system.

The service chain system determines the service chain according to the service chain information, and determines the service according to the service identity. The value-added service processor in the service chain performs value-added processing on the service to obtain target service information.

304. The PCRF receives target service information, returned by the service chain system, of the service corresponding to the service identity.

305. The PCRF generates a first control policy according to the target service information.

306. The PCRF sends the first control policy to a PCEF, so that the PCEF reserves a first network resource according to the first control policy.

Step 304 to step 306 are similar to step 204 to step 206 in the embodiment shown in FIG. 2, and details are not described herein.

In this embodiment of the present disclosure, a PCRF obtains service information; when determining, according to user information and the service information, that a service requires QoS guarantee, the PCRF generates service chain information and sends the service chain information and a service identity to a service chain system; the PCRF receives target service information, returned by the service chain system, of the service corresponding to the service identity; and the PCRF generates a first control policy according to the target service information and sends the first control policy to a PCEF, so that the PCEF reserves a network resource according to the first control policy. In this case, a network resource used by a user is a network resource corresponding to a guaranteed service after value-added processing, thereby meeting the user's actual requirement and improving service experience of the user.

Optionally, on the basis of the embodiment shown in FIG. 3, in another embodiment of the service processing method in this embodiment of the present disclosure, the PCRF receives the target service information returned by a value-added service processor for QoS guarantee in the service chain system, where the target service information is obtained after the value-added service processor for QoS guarantee processes the service corresponding to the service identity.

In this embodiment of the present disclosure, a service chain system determines a service chain according to service chain information, and determines a service according to a service identity; after performing value-added processing on the service to obtain target service information, a value-added service processor for QoS guarantee in the service chain returns the target service information to a PCRF; and the PCRF receives the target service information.

For ease of understanding, the following describes the service processing method in this embodiment of the present disclosure in detail by using a specific application scenario:

In the specific application scenario of this embodiment, an AF is a video provider, a service is a video service provided by the video provider, service information is video stream information, and a network resource is bandwidth. In addition, it is assumed that Zhang San is a gold user of a network service provider, the network service provider provides a video guaranteed service and a video optimization service for the gold user, the network service provider provides a guaranteed service for the video provider, and a video optimizer provided by the network service provider is dedicated to QoS guarantee. For a network architecture that implements this embodiment, refer to FIG. 1, in which the SP is located on the video provider side, and the SPR, the PCRF, the PCEF, the TDF, the RCAF, and the value-added service processor are located on the network service provider side. A specific implementation procedure is as follows:

The PCRF may obtain the video stream information of a video from the video provider, where a video identity included in the video stream information is, for example, "nba020703".

When Zhang San accesses the video provided by the video provider, the PCRF may determine, according to "Zhang San is a gold user of the network service provider", "the network service provider provides a video guaranteed service and a video optimization service for the gold user", and "the network service provider provides a guaranteed service for the video provider", that the video requires QoS guarantee, and the PCRF generates service chain information. The service chain information is, for example, "003, video optimization-NAT", where "003" is a service chain identity, "video optimization-NAT" is a value-added service type list, including two value-added service types: "video optimization" and "NAT".

The PCRF sends "nba020703" and "003, video optimization-NAT" to a service chain system. The service chain system optimizes a video with the identity "nba020703" to obtain optimized video stream information. Specifically, a service control network element in the service chain system may determine, according to "003, video optimization-NAT", that the video stream with the identity "nba020703" needs to pass through the video optimizer and a NAT processor, and the service control network element may select at least one from multiple video optimizers dedicated to QoS guarantee. The video optimizer in the service chain system optimizes the video with the identity "nba020703" to obtain target service information, where the target service information is an optimized video stream.

Specifically, part of the video stream information before and after video optimization is shown in the following table:

| | Video identity | Codec type | Bitstream (kbps) | Frame frequency (fps) | Required bandwidth (kbps) |
|---|---|---|---|---|---|
| Before optimization | nba020703 | H.263 | 384 | 30 | 416 |
| After optimization | nba020703 | H.263 | 64 | 15 | 74 |

The PCRF receives the optimized video stream information returned by the video optimizer, for example, ('nba020703', 'H.263', '64 kbps', '15 fps', '74 kbps').

The PCRF determines a QoS parameter corresponding to the video according to ('nba020703', 'H.263', '64 kbps', '15 fps', '74 kbps'), so as to generate a first control policy. For example, the first control policy is ('GZ004', 'nba020703', '74 kbps', '8', '2', '30 kbps', '500 kbps'), where 'GZ004' is a PCC rule name, 'nba020703' is a video stream identity, '74 kbps' is bandwidth required by the optimized video stream, '8' is a QCI, '2' is an ARP, '30 kbps' is a GBR, and '500 kbps' is an MBR.

The PCRF sends ('GZ004', 'nba020703', '74 kbps', '8', '2', '30 kbps', '500 kbps') to the PCEF, and the PCEF sets bandwidth corresponding to the video stream of 'nba020703' to 74 kbps according to ('GZ004', 'nba020703', '74 kbps', '8', '2', '30 kbps', '500 kbps'). In this case, the bandwidth provided by the network service provider for Zhang San is the bandwidth required by the optimized video stream, thereby meeting the user's actual requirement.

It should be understood that, the foregoing example is merely illustrative, and in specific actual application, the video stream information, the video identity, the service chain information, and the first control policy may also be indicated in another form. This is not limited herein.

Figure 4:
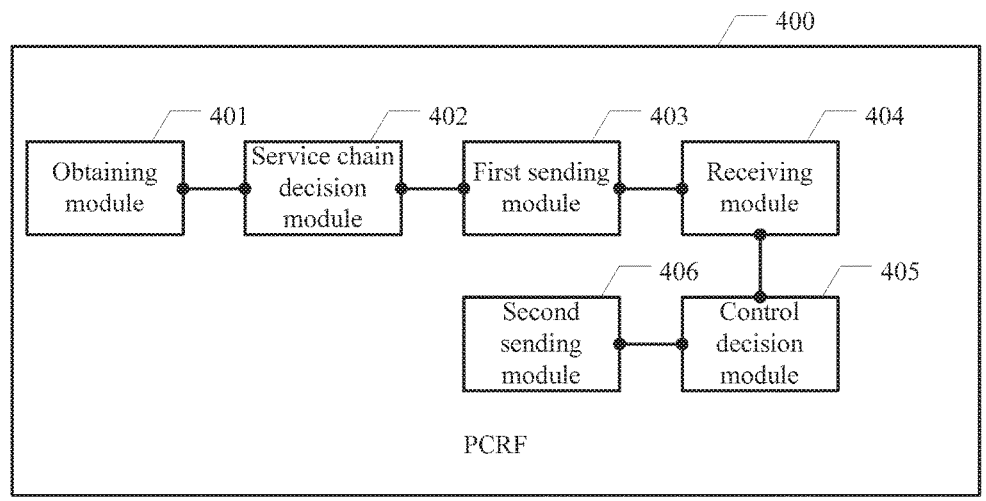
FIG. 4 is a schematic structural diagram of a PCRF according to an embodiment of the present disclosure.

The foregoing describes the service processing method in the embodiments of the present disclosure from the perspective of a method, and the following describes the embodiments of the present disclosure from the perspective of an apparatus. Referring to FIG. 4, an embodiment of a PCRF in an embodiment of the present disclosure includes:

an obtaining module 401, configured to obtain service information of a service, where the service information includes a service identity;

a service chain decision module 402, configured to obtain, according to user information and the service information, information indicating that the service requires quality of service QoS guarantee, and service chain information;

a first sending module 403, configured to: when it is determined, according to the service chain information, that a network resource occupied by the service may be changed, send the service identity and the information indicating that the service requires the QoS guarantee to a value-added service processor;

a receiving module 404, configured to receive target service information, returned by the value-added service processor, of the service corresponding to the service identity;

a control decision module 405, configured to generate a first control policy according to the target service information; and a second sending module 406, configured to send the first control policy to a PCEF, so that the PCEF reserves a first network resource according to the first control policy.

In this embodiment of the present disclosure, an obtaining module 401 obtains service information; a service chain decision module 402 makes a service chain decision according to user information and the service information, to obtain information indicating that a service requires QoS guarantee, and service chain information; when it is determined, according to the service chain information, that a network resource occupied by the service may be changed, a first sending module 403 sends a service identity and the information indicating that the service requires the QoS guarantee to a value-added service processor; a receiving module 404 receives target service information, returned by the value-added service processor, of the service corresponding to the service identity; a control decision module 405 generates a first control policy according to the target service information; and a second sending module 406 sends the first control policy to a PCEF, so that the PCEF reserves, according to the first control policy, a network resource occupied by a target service. In this case, a network resource used by a user is a network resource occupied by a guaranteed service after value-added processing, thereby meeting the user's actual requirement and improving service experience of the user.

In actual application, in some situations, when a fault occurs in the value-added service processor, the PCRF may further modify, according to an actual situation, a network resource affected by the value-added service processor.

Figure 5:
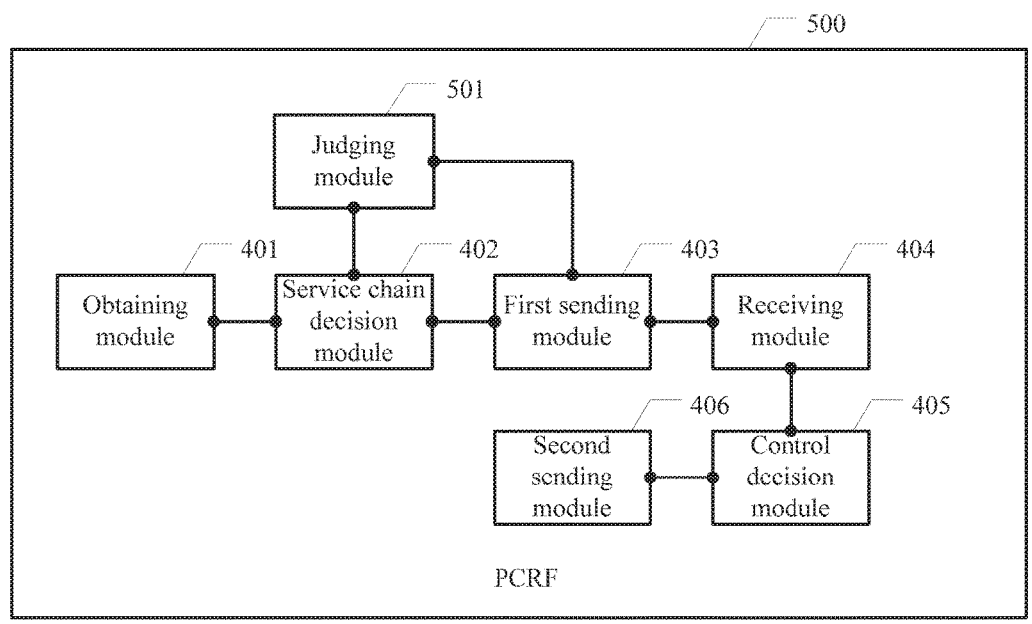
FIG. 5 is another schematic structural diagram of a PCRF according to an embodiment of the present disclosure.

Optionally, on the basis of the embodiment shown in FIG. 4, referring to FIG. 5, in another embodiment of the PCRF in this embodiment of the present disclosure, the PCRF further includes a judging module 501.

The judging module 501 is configured to: determine whether a value-added service type list included in the service chain information includes a preset service type; and if the value-added service type list includes the preset service type, determine that the network resource occupied by the service may be changed; or the judging module 501 is configured to determine whether a service chain identity included in the service chain information is a preset identity; and if the service chain identity is the preset identity, determine that the network resource occupied by the service may be changed.

Optionally, on the basis of the embodiment shown in FIG. 4 or the optional embodiment, in another embodiment of the PCRF in this embodiment of the present disclosure, that a service chain decision module 402 is configured to obtain, according to user information and the service information, information indicating that the service requires quality of service QoS guarantee may be implemented in the following manner: the service chain decision module 402 is specifically configured to: when it is determined, according to the user information and the service information, that the service requires the QoS guarantee, generate a QoS guarantee indication, where the information indicating that the service requires the QoS guarantee is the QoS guarantee indication.

Optionally, on the basis of the embodiment shown in FIG. 4 or the optional embodiment, in another embodiment of the PCRF in this embodiment of the present disclosure, the service chain decision module 402 is further configured to generate a control parameter according to the user information and the service information; and the first sending module 403 is specifically configured to: when it is determined, according to the service chain information, that the network resource occupied by the service may be changed, send the service identity, the information indicating that the service requires the QoS guarantee, and the control parameter to the value-added service processor, so that the value-added service processor processes, according to the control parameter, the service corresponding to the service identity, to obtain the target service information.

Figure 6:
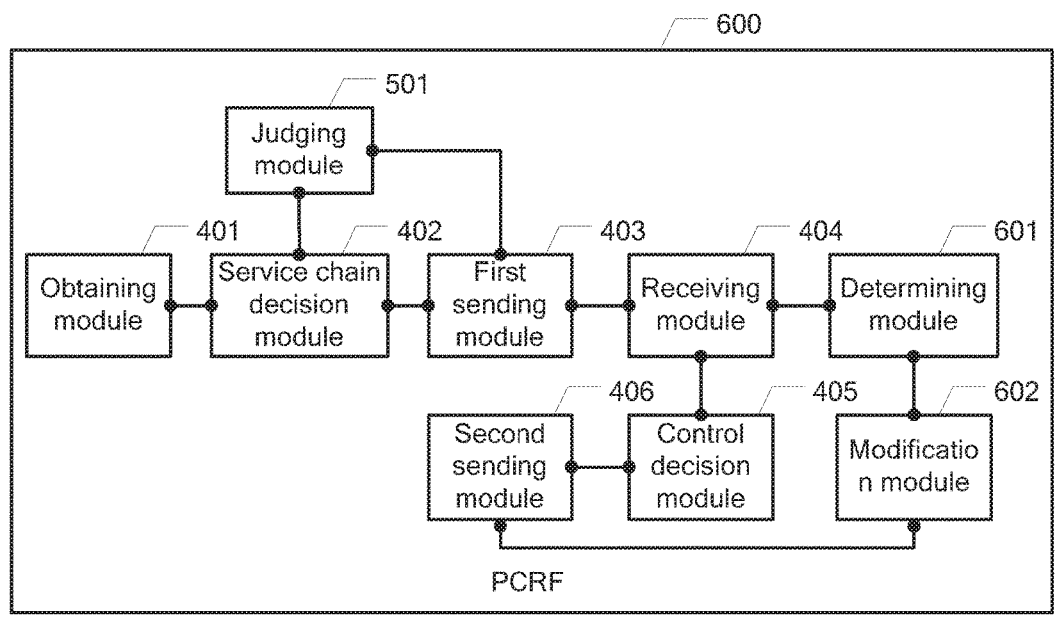
FIG. 6 is another schematic structural diagram of a PCRF according to an embodiment of the present disclosure.

Optionally, on the basis of the embodiment shown in FIG. 4 or the optional embodiment, referring to FIG. 6, in another embodiment of the PCRF in this embodiment of the present disclosure, the receiving module 404 is further configured to receive a fault notification that a fault occurs in the value-added service processor; and the PCRF further includes a determining module 601 and a modification module 602; the determining module 601 is configured to determine the first control policy according to the fault notification and the service information;

the modification module 602 is configured to modify the first control policy according to the service information, to obtain a second control policy; and the second sending module 406 is further configured to send the second control policy to the PCEF, so that the PCEF changes the first network resource into a second network resource according to the second control policy.

Optionally, on the basis of the embodiment shown in FIG. 4 or the optional embodiment, in another embodiment of the PCRF in this embodiment of the present disclosure, the determining module 601 is specifically configured to: determine, according to a value-added service type that is corresponding to the value-added service processor and is carried in the fault notification, service chain information corresponding to the value-added service type; determine, according to the service chain information, a target service identity corresponding to the service chain information; and when the target service identity is the same as the service identity included in the service information, determine that a policy corresponding to the target service identity is the first control policy.

In this embodiment, the service chain information includes the service chain identity and/or the value-added service list. It may be understood that the determining module may find, according to the service chain identity, or the value-added service list, or their combination, the first control policy corresponding to the value-added service processor in which the fault occurs.

For implementation of a specific working process of interaction of network elements in the embodiment or the optional embodiment of the PCRF shown in FIG. 4, refer to the embodiment or the optional embodiment of the service processing method shown in FIG. 2, and details are not described herein.

Figure 7:
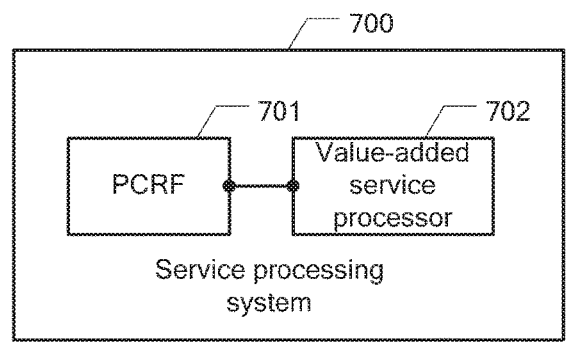
FIG. 7 is a schematic structural diagram of a service processing system according to an embodiment of the present disclosure.

Referring to FIG. 7, an embodiment of a service processing system in an embodiment of the present disclosure includes:

a PCRF 701 and a value-added service processor 702.

The PCRF 701 is configured to: obtain service information of a service from an application function AF, where the service information includes a service identity; obtain, according to user information and the service information, information indicating that the service requires quality of service QoS guarantee, and service chain information; when determining, according to the service chain information, that a network resource occupied by the service may be changed, send the service identity and the information indicating that the service requires the QoS guarantee to the value-added service processor 702; receive target service information, returned by the value-added service processor 702, of the service corresponding to the service identity; generate a first control policy according to the target service information;

and send the first control policy to a PCEF, so that the PCEF reserves a first network resource according to the first control policy; and the value-added service processor 702 is configured to receive the service identity and the information indicating that the service requires the QoS guarantee, and return the target service information of the service corresponding to the service identity to the PCRF 701, where the service identity and the information indicating that the service requires the QoS guarantee are sent by the PCRF 701.

Optionally, in another embodiment of the service processing system in this embodiment of the present disclosure, the value-added service processor 702 is further configured to determine the service according to the service identity, and process the service to obtain the target service information.

Optionally, in another embodiment of the service processing system in this embodiment of the present disclosure, the PCRF 701 is further configured to generate a control parameter according to the user information and the service information;

that the PCRF 701 is configured to send the service identity and the information indicating that the service requires the QoS guarantee to the value-added service processor 702 may be implemented in the following manner: the PCRF 701 is configured to send the service identity, the information indicating that the service requires the QoS guarantee, and the control parameter to the value-added service processor; and the value-added service processor 702 is further configured to receive the control parameter, and process, according to the control parameter, the service corresponding to the service identity, to the obtain the target information.

Optionally, in another embodiment of the service processing system in this embodiment of the present disclosure, that the value-added service processor 702 is configured to process, according to the control parameter, the service corresponding to the service identity, to obtain the target information may be implemented in the following manner: the value-added service processor 702 is configured to select a service optimization parameter according to the control parameter, and process the service according to the service optimization parameter, to obtain the target service information.

Optionally, in another embodiment of the service processing system in this embodiment of the present disclosure, that the value-added service processor 702 is configured to return the target service information of the service corresponding to the service identity to the PCRF 701 may be implemented in the following manner: the value-added service processor 702 is configured to return, according to the information indicating that the service requires the QoS guarantee, the target service information of the service corresponding to the service identity to the PCRF 701.

For implementation of a specific working process of interaction of network elements in the embodiment or the optional embodiment of the service processing system shown in FIG. 7, refer to the embodiment or the optional embodiment of the service processing method shown in FIG. 3, and details are not described herein.

For ease of understanding the foregoing embodiment, the following uses an interaction process of the modules in the service processing system in a specific application scenario as an example for description:

The obtaining module 401 obtains service information of a service. The service chain decision module 402 obtains, according to user information and the service information, information indicating that the service requires QoS guarantee, and service chain information. When the judging module 501 determines, according to the service chain information, that a network resource occupied by the service may be changed, the first sending module 403 sends a service identity and the information indicating that the service requires the QoS guarantee to the value-added service processor 702. The receiving module 404 receives target service information, returned by the value-added service processor 702, of the service corresponding to the target identity. The control decision module 405 generates a first control policy according to the target service information. The second sending module 406 sends the first control policy to a PCEF.

The service chain information includes a value-added service type list, and that the judging module 501 determines, according to the service chain information, that a network resource occupied by the service may be changed may be implemented in the following manner: the judging module 501 determines whether the value-added service type list includes a preset service type; and if the value-added service type list includes the preset service type, determines that the network resource occupied by the service may be changed.

The service chain information includes a service chain identity, and that the judging module 501 determines, according to the service chain information, that a network resource occupied by the service may be changed may be implemented in the following manner: the judging module 501 determines whether the service chain identity is a preset identity; and if the service chain identity is the preset identity, determines that the network resource occupied by the service may be changed.

That the service chain decision module 402 obtains, according to user information and the service information, information indicating that the service requires QoS guarantee may be implemented in the following manner: when determining, according to the user information and the service information, that the service requires the QoS guarantee, the service chain decision module 402 generates a QoS guarantee indication, where the information indicating that the service requires the QoS guarantee is the QoS guarantee indication.

The foregoing service processing method further includes: the service chain decision module 402 generates a control parameter according to the user information and the service information; and that the first sending module 403 sends the service identity and the information indicating that the service requires the QoS guarantee to the value-added service processor 702 includes: the first sending module 403 sends the service identity, the information indicating that the service requires the QoS guarantee, and the control parameter to the value-added service processor 702, so that the value-added service processor 702 processes, according to the control parameter, the service corresponding to the service identity, to obtain the target service information.

The foregoing service processing method further includes: the receiving module 404 receives a fault notification that a fault occurs in the value-added service processor 702; the determining module 601 determines the first control policy according to the fault notification and the service information obtained from the AF; the modification module 602 modifies the first control policy according to the service information, to obtain a second control policy; the second sending module 606 sends the second control policy to the PCEF, so that the PCEF changes the first network resource into a second network resource according to the second control policy.

That the determining module 601 determines the first control policy according to the fault notification and the service information obtained from the AF includes: the determining module 601 determines, according to a value-added service type that is corresponding to the value-added service processor and is carried in the fault notification, service chain information corresponding to the value-added service type, where the service chain information may be the value-added service type list or the service chain identity; determines a target service identity corresponding to the service chain information according to the service chain information; and when the target service identity is the same as the service identity included in the service information, determines that a policy corresponding to the target service identity is the first control policy.

In this embodiment, for implementation of the PCRF in the service processing system, refer to the apparatus embodiment shown in FIG. 4 or the optional embodiment, and details are not described herein.

Figure 8:
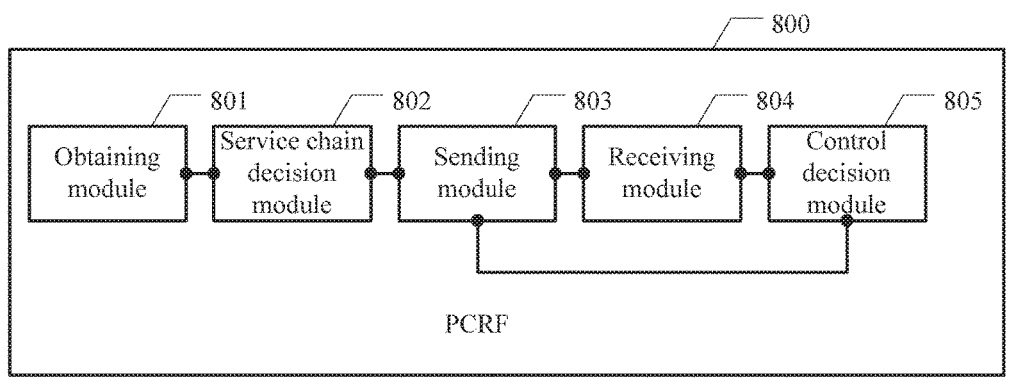
FIG. 8 is another schematic structural diagram of a PCRF according to an embodiment of the present disclosure.

In actual application, the network service provider may set a value-added service processor dedicated to QoS guarantee, to process a service, and correspondingly, the PCRF set by the network service provider may also be different. Referring to FIG. 8, another embodiment of the PCRF in this embodiment of the present disclosure includes:

an obtaining module 801, configured to obtain service information of a service, where the service information includes a service identity;

a service chain decision module 802, configured to: when it is determined, according to user information and the service information, that the service requires QoS guarantee, generate service chain information;

a sending module 803, configured to send the service chain information and the service identity to a service chain system;

a receiving module 804, configured to receive target service information, returned by the service chain system, of the service corresponding to the service identity;

a control decision module 805, configured to generate a first control policy according to the target service information; and the sending module 803 is further configured to send the first control policy to a PCEF, so that the PCEF reserves a first network resource according to the first control policy.

In this embodiment of the present disclosure, an obtaining module 801 obtains service information; when it is determined, according to user information and the service information, that a service requires QoS guarantee, a service chain decision module 802 generates service chain information; a sending module 803 sends the service chain information and a service identity to a service chain system; the service chain system performs value-added processing on the service corresponding to the service identity, to obtain target service information, and returns the target service information to a receiving module 804; a control decision module 805 generates a first control policy according to the target service information, instead of generating, according to the obtained service information of the service on which no value-added processing is performed, a control policy preset by a network service provider; and a sending module 803 sends the first control policy to a PCEF, so that the PCEF reserves a network resource according to the first control policy. In this case, a network resource used by a user is a network resource corresponding to a guaranteed service after value-added processing, thereby meeting the user's actual requirement and improving service experience of the user.

Optionally, on the basis of the embodiment shown in FIG. 8, in another embodiment of the PCRF in this embodiment of the present disclosure, the receiving module 804 is specifically configured to receive target service information, returned by a value-added service processor for QoS guarantee in the service chain system, where the target service information is obtained after the value-added service processor for QoS guarantee processes the service corresponding to the service identity.

For implementation of a specific working process of interaction of network elements in the embodiment or the optional embodiment of the PCRF shown in FIG. 8, refer to the embodiment or the optional embodiment of the service processing method shown in FIG. 3, and details are not described herein.

Figure 9:
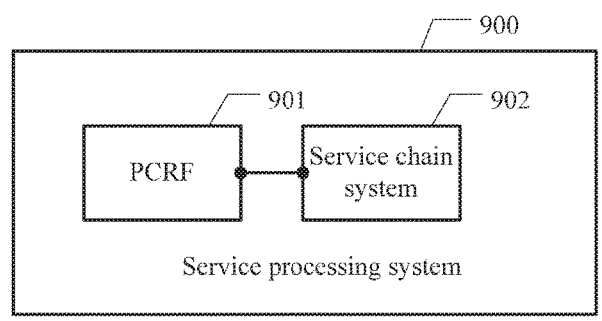
FIG. 9 is another schematic structural diagram of a service processing system according to an embodiment of the present disclosure.

Referring to FIG. 9, another embodiment of the service processing system in this embodiment of the present disclosure includes:

a PCRF 901 and a service chain system 902.

The PCRF 901 is configured to: obtain service information of a service, where the service information includes a service identity; when determining, according to user information and the service information, that a service requires QoS guarantee, generate service chain information; send the service chain information and the service identity to the service chain system 902; receive target service information, returned by the service chain system 902, of the service corresponding to the service identity; generate a first control policy according to the target service information; and send the first control policy to a PCEF, so that the PCEF reserves a first network resource according to the first control policy.

The service chain system 902 is configured to receive the service chain information and the service identity that are sent by the PCRF 901, and return the target service information of the service corresponding to the service identity to the PCRF 901.

Optionally, on the basis of the embodiment shown in FIG. 9, in another embodiment of the service processing system in this embodiment of the present disclosure, the service chain system 902 is further configured to determine, according to the service chain information, a value-added service processor 9022 for QoS guarantee in the service chain system 902, and process the service corresponding to the service identity, to obtain the target service information.

Figure 10:
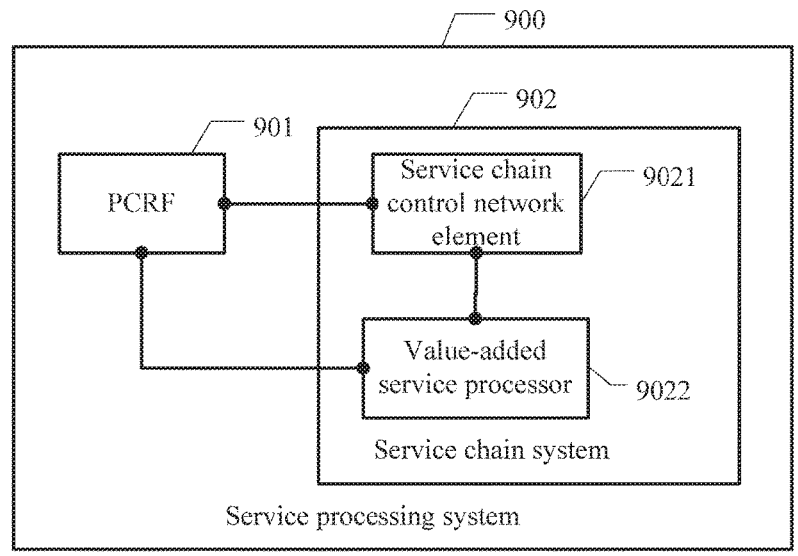
FIG. 10 is another schematic structural diagram of a service processing system according to an embodiment of the present disclosure.

Optionally, on the basis of the embodiment shown in FIG. 9, in another embodiment of the service processing system in this embodiment of the present disclosure, referring to FIG. 10, the service chain system 902 includes a service chain control network element 9021 and a value-added service processor 9022 for QoS guarantee.

That the service chain system 902 is configured to receive the service chain information and the service identity that are sent by the PCRF 901 may be implemented in the following manner: the service chain control network element 9021 receives the service chain information and the service identity that are sent by the PCRF 901.

That the service chain system 902 is configured to determine, according to the service chain information, a value-added service processor 9022 for QoS guarantee in the service chain system may be implemented in the following manner: the service chain control network element 9021 is configured to determine the value-added service processor 9022 for QoS guarantee.

That the service chain system 902 is configured to process the service corresponding to the service identity, to obtain the target service information may be implemented in the following manner: the value-added service processor 9022 for QoS guarantee is configured to process the service corresponding to the service identity, to obtain the target service information.

That the service chain system 902 is configured to return the target service information of the service corresponding to the service identity to the PCRF 901 may be implemented in the following manner: the value-added service processor 9022 for QoS guarantee is configured to return the target service information to the PCRF 901.

Optionally, in another embodiment of the service processing system in this embodiment of the present disclosure, that the PCRF 901 is configured to receive target information, returned by the service chain system 902, of the service corresponding to the service identity may be implemented in the following manner: the PCRF 901 is configured to receive the target service information returned by the value-added service processor 9022 for QoS guarantee.

Optionally, in another embodiment of the service processing system in this embodiment of the present disclosure, that the PCRF 901 is configured to send the service chain information and the service identity to the service chain system 902 may be implemented in the following manner: the PCRF 901 is configured to send the service chain information and the service identity to the service chain control network element 9021 in the service chain system.

For implementation of a specific working process of interaction of network elements in the embodiment or the optional embodiment of the service processing system shown in FIG. 10, refer to the embodiment or the optional embodiment of the service processing method shown in FIG. 3, and details are not described herein.

For ease of understanding the foregoing embodiment, the following uses an interaction process of the modules in the service processing system in a specific application scenario as an example for description:

The obtaining module 801 obtains service information of a service, where the service information includes a service identity.

When determining, according to user information and the service information, that the service requires quality of service QoS guarantee, the service chain decision module 802 generates service chain information.

The sending module 803 sends the service chain information and the service identity to the service chain control network element 9021 in the service chain system 902.

The receiving module 804 receives target service information, returned by the value-added service processor 9022 in the service chain system 902, of the service corresponding to the service identity.

The control decision module 805 generates a first control policy according to the target service information.

The sending module 803 sends the first control policy to the PCEF, so that the PCEF reserves a first network resource according to the first control policy.

The receiving module 804 is specifically configured to receive target service information returned by a value-added service processor for QoS guarantee in the service chain system 902, where the target service information is obtained after the value-added service processor for QoS guarantee processes the service corresponding to the service identity.

It may be clearly understood by persons skilled in the art that, for the purpose of convenient and brief description, for a specific working process of the foregoing system, apparatus, and unit, reference may be made to a corresponding process in the foregoing method embodiments, and details are not described herein.

In the multiple embodiments of the PCRF, it should be understood that, in an implementation, the obtaining module, the receiving module, the first sending module, the second sending module, and the sending module may be implemented by using a transceiver; and the service chain decision module, the control decision module, the judging module, the determining module, and the modification module may be implemented by a processor by executing a program or an instruction in a memory (in other words, implemented by mutual cooperation between the processor and a special instruction in the memory coupled to the processor). For a specific implementation, refer to the prior art, and details are not described herein. The present disclosure includes but is not limited to the foregoing implementations. It should be understood that, any solution implemented according to the idea of the present disclosure shall fall within the protection scope of the embodiments of the present disclosure.

Figure 11:
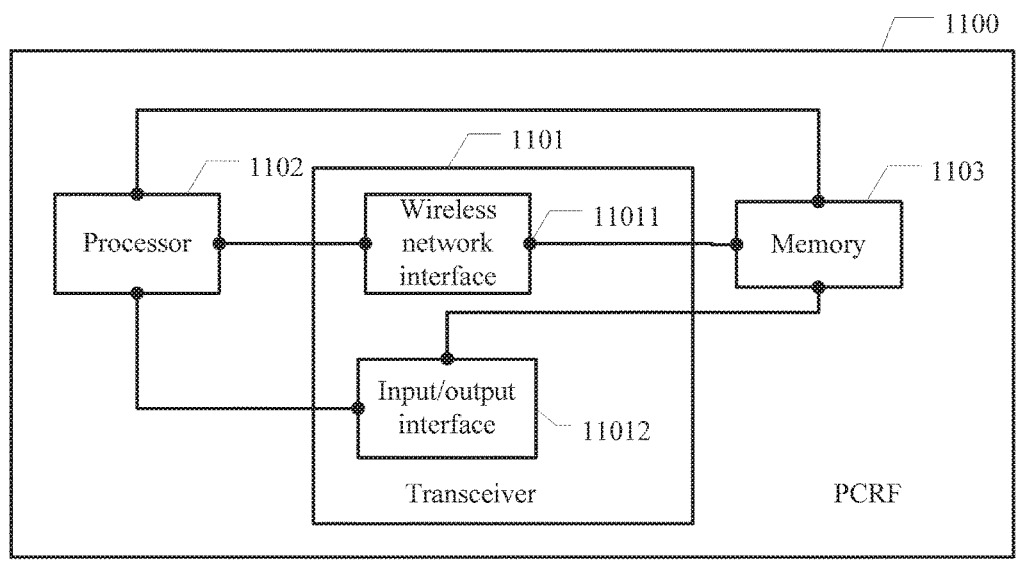
FIG. 11 is another schematic structural diagram of a PCRF according to an embodiment of the present disclosure.

An embodiment of the present disclosure provides a hardware structure of a PCRF. Referring to FIG. 11, the hardware structure of the PCRF may include at least one transceiver 1101, at least one processor 1102, and a memory 1103.

The transceiver 1101 may include at least one wired or wireless network interface 11011, or at least one input/output interface 11012.

The processor 1102 mainly includes a general purpose processor (for example, a CPU).

The memory 1103 may include a read-only memory or a random access memory, and provide an instruction or data to the processor 1102. A part of the memory 1103 may further include a non-volatile random access memory.

With reference to the accompanying drawings, the following describes in detail a technical solution in which an obtaining module, a receiving module, a first sending module, and a second sending module may be implemented by using a transceiver, and a service chain decision module, a control decision module, a judging module, and a determining module may be implemented by a processor by executing a program or an instruction in a memory:

The transceiver 1101 obtains service information of a service.

The processor 1102 is configured to obtain, according to user information and the service information, information indicating that the service requires QoS guarantee, and service chain information.

When the processor 1102 determines, according to the service chain information, that a network resource occupied by the service may be changed, the transceiver 1101 sends a service identity and the information indicating that the service requires the QoS guarantee to a value-added service processor.

The transceiver 1101 receives target service information, returned by the value-added service processor, of the service corresponding to the service identity.

The processor 1102 is configured to generate a first control policy according to the target service information.

The transceiver 1101 sends the first control policy to a PCEF.

In some implementations, the memory 1103 may be configured to store the service information, the information indicating that the service requires the QoS guarantee, or the service chain information, and provides the instruction or data to the processor 1102.

Optionally, in some possible implementations of the present disclosure, that the processor 1102 determines, according to the service chain information, that a network resource occupied by the service may be changed may be implemented in the following manner:

the processor 1102 determines whether the value-added service type list includes a preset service type; and if the value-added service type list includes the preset service type, determines that the network resource occupied by the service may be changed.

Optionally, in some possible implementations of the present disclosure, that the processor 1102 determines, according to the service chain information, that a network resource occupied by the service may be changed may be implemented in the following manner:

the processor 1102 determines whether the service chain identity is a preset identity; and if the service chain identity is the preset identity, determines that the network resource occupied by the service may be changed.

Optionally, in some possible implementations of the present disclosure, that the processor 1102 obtains, according to user information and the service information, information indicating that the service requires QoS guarantee may be implemented in the following manner:

when determining, according to the user information and the service information, that the service requires the QoS guarantee, the processor 1102 generates a QoS guarantee indication, where the information indicating that the service requires the QoS guarantee is the QoS guarantee indication.

Optionally, in some possible implementations of the present disclosure, the processor 1102 generates a control parameter according to the user information and the service information; and that the transceiver 1101 sends the service identity and the information indicating that the service requires the QoS guarantee to a value-added service processor includes:

the transceiver 1101 sends the service identity, the information indicating that the service requires the QoS guarantee, and the control parameter to the value-added service processor, so that the value-added service processor processes, according to the control parameter, the service corresponding to the service identity, to obtain the target service information.

Optionally, in some possible implementations of the present disclosure, the transceiver 1101 receives a fault notification that a fault occurs in the value-added service processor;

the processor 1102 determines the first control policy according to the fault notification and the service information obtained from the AF, and modifies the first control policy according to the service information, to obtain a second control policy; and the transceiver 1101 sends the second control policy to the PCEF, so that the PCEF changes the first network resource into a second network resource according to the second control policy.

Optionally, in some possible implementations of the present disclosure, that the processor 1102 determines the first control policy according to the fault notification and the service information obtained from the AF includes:

the processor 1102 determines, according to a value-added service type that is corresponding to the value-added service processor and is carried in the fault notification, service chain information corresponding to the value-added service type; determines, according to the service chain information, a target service identity corresponding to the service chain information; and when the target service identity is the same as the service identity included in the service information, determines that a policy corresponding to the target service identity is the first control policy.

In this embodiment of the present disclosure, a transceiver 1101 obtains service information; a processor 1102 makes a service chain decision according to user information and the service information, to obtain information indicating that a service requires QoS guarantee, and service chain information; when the processor 1102 determines, according to the service chain information, that a network resource occupied by the service may be changed, the transceiver 1101 sends a service identity and the information indicating that the service requires the QoS guarantee to a value-added service processor; the transceiver 1101 receives target service information, returned by the value-added service processor, of the service corresponding to the service identity; the processor 1102 generates a first control policy according to the target service information, instead of generating, according to the service information of the service on which no value-added processing is performed, a control policy preset by a network service provider; and the transceiver 1101 sends the first control policy to a PCEF, so that the PCEF reserves a network resource according to the first control policy. In this case, a network resource used by a user is a network resource corresponding to a guaranteed service after value-added processing, thereby meeting the user's actual requirement and improving service experience of the user.

For the value-added service processor in this embodiment, refer to the description of the part of the value-added service processor in the embodiment of the service processing system shown in FIG. 7 for understanding, and details are not described herein.

An embodiment of the present disclosure provides a hardware structure of a PCRF. Referring to FIG. 11, the hardware structure of the PCRF may include at least one transceiver 1101, at least one processor 1102, and a memory 1103.

The transceiver 1101 may include at least one wired or wireless network interface 11011, or at least one input/output interface 11012.

The processor 1102 mainly includes a general purpose processor (for example, a CPU).

The memory 1103 may include a read-only memory or a random access memory, and provide an instruction or data to the processor 1102. A part of the memory 1103 may further include a non-volatile random access memory.

With reference to the accompanying drawings, the following describes in detail a technical solution in which an obtaining module, a receiving module, and a sending module may be implemented by using a transceiver, and a service chain decision module and a control decision module may be implemented by a processor by executing a program or an instruction in a memory:

The transceiver 1101 is configured to obtain service information of a service, where the service information includes a service identity.

The processor 1102 is configured to: when determining, according to user information and the service information, that the service requires QoS guarantee, generate service chain information.

The transceiver 1101 is configured to send the service chain information and the service identity to a service chain system.

The transceiver 1101 is configured to receive target service information, returned by the service chain system, of the service corresponding to the service identity.

The processor 1102 is configured to generate a first control policy according to the target service information.

The transceiver 1101 is further configured to send the first control policy to a PCEF, so that the PCEF reserves a first network resource according to the first control policy.

Optionally, in some embodiments of the present disclosure, the transceiver 1101 is specifically configured to receive target service information returned by a value-added service processor for QoS guarantee in the service chain system, where the target service information is obtained after the value-added service processor for QoS guarantee processes the service corresponding to the service identity.

For the service chain system in this embodiment, refer to the description of the part of the service chain system in the embodiment of the service processing system shown in FIG. 10 for understanding, and details are not described herein.

In this embodiment of the present disclosure, a transceiver 1101 obtains service information; when determining, according to user information and the service information, that a service requires QoS guarantee, a processor 1102 generates service chain information; the transceiver 1101 sends the service chain information and a service identity to a service chain system; the transceiver 1101 receives target service information, returned by the service chain system, of the service corresponding to the service identity; the processor 1102 generates a first control policy according to the target service information; and the transceiver 1101 sends the first control policy to a PCEF, so that the PCEF reserves a network resource according to the first control policy. In this case, a network resource used by a user is a network resource corresponding to a guaranteed service after value-added processing, thereby meeting the user's actual requirement and improving service experience of the user.

It may be clearly understood by persons skilled in the art that, for the purpose of convenient and brief description, for a specific working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several indications for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed:

1. A service processing method, comprising:
    obtaining, by a policy and charging rules function (PCRF), service information of a service, wherein the service information comprises a service identity;
    obtaining, by the PCRF according to user information and the service information, information indicating that the service requires quality of service (QoS) guarantee, and service chain information;
    determining, by the PCRF, according to the service chain information, that a network resource occupied by the service may be changed, and sending, by the PCRF, the service identity and the information indicating that the service requires the QoS guarantee to a value-added service processor;
    receiving, by the PCRF, target service information, from the value-added service processor, of the service corresponding to the service identity;
    generating, by the PCRF, a first control policy according to the target service information, and sending the first control policy to a policy and charging enforcement function (PCEF) for reserving a first network resource according to the first control policy;
    receiving, by the PCRF, a fault notification that a fault occurs in the value-added service processor;
    determining, by the PCRF, the first control policy according to the fault notification and the service information;
    modifying, by the PCRF, the first control policy according to the service information, to obtain a second control policy; and
    sending, by the PCRF, the second control policy to the PCEF, for changing, by the PCEF, the first network resource into a second network resource according to the second control policy.

2. The service processing method according to claim 1, wherein:
    the service chain information comprises a value-added service type list; and
    determining, by the PCRF, according to the service chain information, that a network resource occupied by the service may be changed comprises:

determining, by the PCRF, whether the value-added service type list comprises a preset service type; and if the value-added service type list comprises the preset service type, determining that the network resource occupied by the service may be changed.

3. The service processing method according to claim 1, wherein:
the service chain information comprises a service chain identity; and
determining, by the PCRF, according to the service chain information, that a network resource occupied by the service may be changed comprises:
determining, by the PCRF, whether the service chain identity is a preset identity; and if the service chain identity is the preset identity, determining that the network resource occupied by the service may be changed.

4. The service processing method according to claim 1, wherein obtaining, by the PCRF according to user information and the service information, information indicating that the service requires QoS guarantee comprises:
determining, by the PCRF, according to the user information and the service information, that the service requires the QoS guarantee, and generating, by the PCRF, a QoS guarantee indication, wherein the information indicating that the service requires the QoS guarantee is the QoS guarantee indication.

5. The service processing method according to claim 1, further comprising:
generating, by the PCRF, a control parameter according to the user information and the service information; and
wherein sending, by the PCRF, the service identity and the information indicating that the service requires the QoS guarantee to a value-added service processor comprises:
sending, by the PCRF, the service identity, the information indicating that the service requires the QoS guarantee, and the control parameter to the value-added service processor for processing by the value-added service processor.

6. The service processing method according to claim 1, wherein determining, by the PCRF, the first control policy according to the fault notification and the service information comprises:
determining, by the PCRF according to a value-added service type that corresponds to the value-added service processor and carried in the fault notification, service chain information corresponding to the value-added service type;
determining, by the PCRF according to the service chain information, a target service identity corresponding to the service chain information; and
when the target service identity is the same as the service identity comprised in the service information, determining, by the PCRF, that a policy corresponding to the target service identity is the first control policy.

7. A policy and charging rules function (PCRF), comprising:
a non-transitory computer readable medium having a plurality of computer readable instructions stored thereon; and
a first processor coupled to the computer readable medium and configured to:
obtain service information of a service, wherein the service information comprises a service identity,
obtain, according to user information and the service information, information indicating that the service requires quality of service (QoS) guarantee, and service chain information,
determine, according to the service chain information, that a network resource occupied by the service may be changed, and send the service identity and the information indicating that the service requires the QoS guarantee to a value-added service processor,
receive target service information, from the value-added service processor, of the service corresponding to the service identity,
generate a first control policy according to the target service information,
send the first control policy to a policy and charging enforcement function (PCEF) to reserve, by the PCEF, a first network resource according to the first control policy,
receive a fault notification that a fault occurs in the value-added service processor,
determine the first control policy according to the fault notification and the service information,
modify the first control policy according to the service information, to obtain a second control policy, and
send the second control policy to the PCEF to change the first network resource into a second network resource according to the second control policy.

8. The PCRF according to claim 7, wherein the first processor is further configured to:
determine whether a value-added service type list comprised in the service chain information comprises a preset service type, and if the value-added service type list comprises the preset service type, determine that the network resource occupied by the service may be changed.

9. The PCRF according to claim 7, wherein the first processor is further configured to:
determine whether a service chain identity comprised in the service chain information is a preset identity, and if the service chain identity is the preset identity, determine that the network resource occupied by the service may be changed.

10. The PCRF according to claim 7, wherein the first processor is further configured to:
determine, according to the user information and the service information, that the service requires the QoS guarantee, and generate a QoS guarantee indication, wherein the information indicating that the service requires the QoS guarantee is the QoS guarantee indication.

11. The PCRF according to claim 7, wherein the first processor is further configured to:
generate a control parameter according to the user information and the service information; and
when it is determined, according to the service chain information, that the network resource occupied by the service may be changed, send the service identity, the information indicating that the service requires the QoS guarantee, and the control parameter to the value-added service processor for processing.

12. The PCRF according to claim 7, wherein the first processor is further configured to:
determine, according to a value-added service type that corresponds to the value-added service processor and carried in the fault notification, service chain information corresponding to the value-added service type;
determine, according to the service chain information, a target service identity corresponding to the service chain information; and when the target service identity is the same as the service identity comprised in the service information, determine that a policy corresponding to the target service identity is the first control policy.

13. A service processing system, comprising:
a value-added service processor;
a policy and charging rules function (PCRF) configured to:
   obtain service information of a service, wherein the service information comprises a service identity,
   obtain, according to user information and the service information, information indicating that the service requires quality of service (QoS) guarantee, and service chain information,
   determine, according to the service chain information, that a network resource occupied by the service may be changed, and send the service identity and the information indicating that the service requires the QoS guarantee to the value-added service processor,
   receive target service information, from the value-added service processor, of the service corresponding to the service identity,
   generate a first control policy according to the target service information,
   generate a control parameter according to the user information and the service information, and
   send the control parameter to the value-added service processor, and
   send the first control policy to a policy and charging enforcement function (PCEF) to reserve a first network resource according to the first control policy; and wherein the value-added service processor is configured to:
   receive the service identity and the information indicating that the service requires the QoS guarantee, and return the target service information of the service corresponding to the service identity to the PCRF, wherein the service identity and the information indicating that the service requires the QoS guarantee are sent by the PCRF,
   receive the control parameter,
   determine the service according to the service identity,
   process, according to the control parameter, the service corresponding to the service identity, to obtain the target service information, and
   select a service optimization parameter according to the control parameter, and process the service according to the service optimization parameter, to obtain the target service information.

14. The service processing system according to claim 13, wherein the value-added service processor is further configured to:
   determine the service according to the service identity, and process the service to obtain the target service information.

15. The service processing system according to claim 13, wherein the value-added service processor is configured to return, according to the information indicating that the service requires the QoS guarantee, the target service information of the service corresponding to the service identity to the PCRF.

* * * * *